(12) United States Patent
Herce

(10) Patent No.: US 11,424,984 B2
(45) Date of Patent: Aug. 23, 2022

(54) AUTODISCOVERY WITH DYNAMIC CONFIGURATION LAUNCHING

(71) Applicant: Elasticsearch B.V., Mountain View, CA (US)

(72) Inventor: Carlos Pérez-Aradros Herce, Logroño (ES)

(73) Assignee: Elasticsearch B.V., Amsterdam (NL)

( * ) Notice: Subject to any disclaimer, the term of this patent is extended or adjusted under 35 U.S.C. 154(b) by 538 days.

(21) Appl. No.: 16/175,682

(22) Filed: Oct. 30, 2018

(65) Prior Publication Data
US 2020/0136908 A1    Apr. 30, 2020

(51) Int. Cl.
| | |
|---|---|
| *H04L 41/08* | (2022.01) |
| *H04L 41/12* | (2022.01) |
| *H04L 41/0816* | (2022.01) |
| *H04L 43/065* | (2022.01) |
| *H04L 41/084* | (2022.01) |

(52) U.S. Cl.
CPC ...... *H04L 41/0886* (2013.01); *H04L 41/0816* (2013.01); *H04L 41/0843* (2013.01); *H04L 41/12* (2013.01); *H04L 43/065* (2013.01)

(58) Field of Classification Search
CPC ............. H04L 41/0886; H04L 41/0816; H04L 41/0843; H04L 41/12; H04L 43/065
USPC ................................................. 709/220, 224
See application file for complete search history.

(56) References Cited

U.S. PATENT DOCUMENTS

| | | | | |
|---|---|---|---|---|
| 7,499,902 | B2 * | 3/2009 | Datla | H04L 41/16 |
| | | | | 706/45 |
| 10,623,433 | B1 * | 4/2020 | Veselov | G06F 9/45558 |
| 11,093,518 | B1 * | 8/2021 | Lu | G06F 16/9535 |
| 2003/0061398 | A1 * | 3/2003 | Wilson | G06F 9/465 |
| | | | | 719/318 |
| 2004/0130745 | A1 * | 7/2004 | Fabel | G06F 3/1205 |
| | | | | 358/1.15 |
| 2009/0248847 | A1 * | 10/2009 | Sutoh | G06F 3/0611 |
| | | | | 709/223 |
| 2014/0137184 | A1 * | 5/2014 | Russello | G06F 21/60 |
| | | | | 726/1 |
| 2014/0156816 | A1 * | 6/2014 | Lopez Da Silva | H04L 41/042 |
| | | | | 709/221 |

(Continued)

*Primary Examiner* — David R Lazaro
*Assistant Examiner* — Mariegeorges A Henry
(74) *Attorney, Agent, or Firm* — Carr & Ferrell LLP

(57) ABSTRACT

Methods and systems for autodiscovery with dynamic configuration are provided. Exemplary methods include: generating a configuration template for a provider, the configuration template including one or more conditions; monitoring for launch of a new event from a provider; based on the monitoring, detecting the new event; determining, for the detected new event, occurrence of at least one condition of the configuration template; and in response to the determining, automatically launching a configuration associated with the new event. New events may be emitted to a common bus by various providers. The provider may be a container-based provider, container orchestration platform, port-based provider, process-based provider, file search provider, or the like. For container providers, an automatically launched configuration can be automatically stopped once the container exits. The method may include determining that a detected new container includes one or more hints for determining a particular configuration to automatically launch.

22 Claims, 10 Drawing Sheets

(56) References Cited

U.S. PATENT DOCUMENTS

| | | | | |
|---|---|---|---|---|
| 2014/0359127 A1* | 12/2014 | Linares | ............... | H04L 41/0816 |
| | | | | 709/226 |
| 2018/0048545 A1* | 2/2018 | Mishalov | ................ | H04L 41/08 |
| 2018/0373551 A1* | 12/2018 | Christensen | .............. | G06F 8/60 |

* cited by examiner

400 ⟍

```
metricbeat.autodiscover:
  providers:
    - type: docker
      templates:
        - condition.contains:
            docker.container.image: etcd
          config:
            - module: etcd
              metricsets: ["leader", "self", "store"]
              hosts: "${data.host}:2379"

output.elasticsearch:
  hosts: ["localhost:9200"]
```

Aspect: port
Module: apache
Hint: 80, 443

Aspect: process
Module: mysql
Hint: mysqld

Aspect: docker-image
Module: postgresql
Hint: postgresql

```
- autodiscover:
   providers:
     - type: ports
       hosts: ["localhost"]
```

```
autodiscover:
   providers:
      - type: docker
      - type: ports
```

```
autodiscover:
   providers:
      - type: kubernetes
        templates:
           - condition.equals:
                pod.labels:
                   environment: production
                   app: apache
             config:
                module: apache
```

```
autodiscover:
   providers:
      - type: kubernetes
        hints.enabled: true
```

```
annotations:
   co.elastic.logs/multiline.pattern: '^\['
   co.elastic.logs/multiline.negate: 'true'
   co.elastic.logs/multiline.match: after
```

```
annotations:
  co.elastic.logs/module: nginx
  co.elastic.logs/fileset.stdout: access
  co.elastic.logs/fileset.stderr: error
```

1200

```
annotations:
  co.elastic.metrics/module: nginx
  co.elastic.metrics/metricsets: stubstatus
  co.elastic.metrics/hosts: '${data.host}:80'
co.elastic.metrics/period: 10s
```

AUTODISCOVERY WITH DYNAMIC CONFIGURATION LAUNCHING

FIELD

The present technology pertains in general to computer systems and more specifically, to monitoring events and dynamic configuration.

BACKGROUND

The approaches described in this section could be pursued but are not necessarily approaches that have previously been conceived or pursued. Therefore, unless otherwise indicated, it should not be assumed that any approaches described in this section qualify as prior art merely by virtue of their inclusion in this section.

Data communications networks can be used for a distributed application structure that divides tasks between the providers of a resource or service, called servers, and service requesters, called clients. A server "host" runs one or more server programs, which share their resources with clients. Traditionally, a user sets up a new host, configures all the services to run on the new host, and configures the monitoring agent to query them periodically. Configuration management tools can be used to facilitate the process, however, the process is very static.

The use of container architectures, for one example, has resulted in a very dynamic environment for which traditional static methods have many drawbacks. Deployments are dynamic where containers sets may grow, shrink, disappear, coming and going from one node (e.g., server) to another. As a result of the dynamic nature, there is no fixed Internet Protocol (IP) address from which to retrieve metrics, logs, etc.

SUMMARY

This summary is provided to introduce a selection of concepts in a simplified form that are further described in the Detailed Description below. This summary is not intended to identify key or essential features of the claimed subject matter, nor is it intended to be used as an aid in determining the scope of the claimed subject matter.

The present disclosure provides various embodiments of systems and methods for autodiscovery monitoring with dynamic configuration launching as described herein. In various embodiments, autodiscover providers work by watching for events on the system and translating those events into internal autodiscover events with a common format. Providers may create and send the events to a common bus. A user can configure a provider using fields from the autodiscover event to set conditions that, when met, automatically launch specific configurations (e.g., instantiate a new module).

One of the many advantages of various embodiments of the present technology is enabling other components to react and adapt to changes in dynamic infrastructures.

In various embodiments, an autodiscovery common event bus also referred to herein as a common bus is provided. Events may be generated by providers (e.g. container-related providers, port-based providers, process-based providers, file search providers, and others providers that may be configured to take advantage of the present technology). Modules may be enabled/disabled based on detection of certain conditions. Some embodiments provide hints-based autodiscovery where hints are information a module can provide to facilitate the autodiscovery process.

Exemplary methods include: generating a configuration template for a provider, the configuration template including one or more conditions; monitoring for launch of a new event from a provider; based on the monitoring, detecting the new event; determining, for the detected new event, occurrence of at least one condition of the configuration template; and in response to the determining, automatically launching a configuration associated with the new event.

BRIEF DESCRIPTION OF THE DRAWINGS

Embodiments are illustrated by way of example, and not by limitation, in the figures of the accompanying drawings, in which like references indicate similar elements and in which:

FIG. 4 illustrates an example configuration template for configuring METRICBEAT to use the DOCKER autodiscover provider.

FIG. 5 illustrates an example of hints for port-based, process-based and container-based providers.

FIG. 6 illustrates an example config for a localhost fully automatic discovery.

FIG. 7 illustrates an example autodiscover "config".

FIG. 8 illustrates an example autodiscover config for KUBERNETES.

FIG. 9 illustrates another example of an autodiscover config for KUBERNETES.

FIG. 10 illustrates annotations, according to an example embodiment.

DETAILED DESCRIPTION

Figure 1:
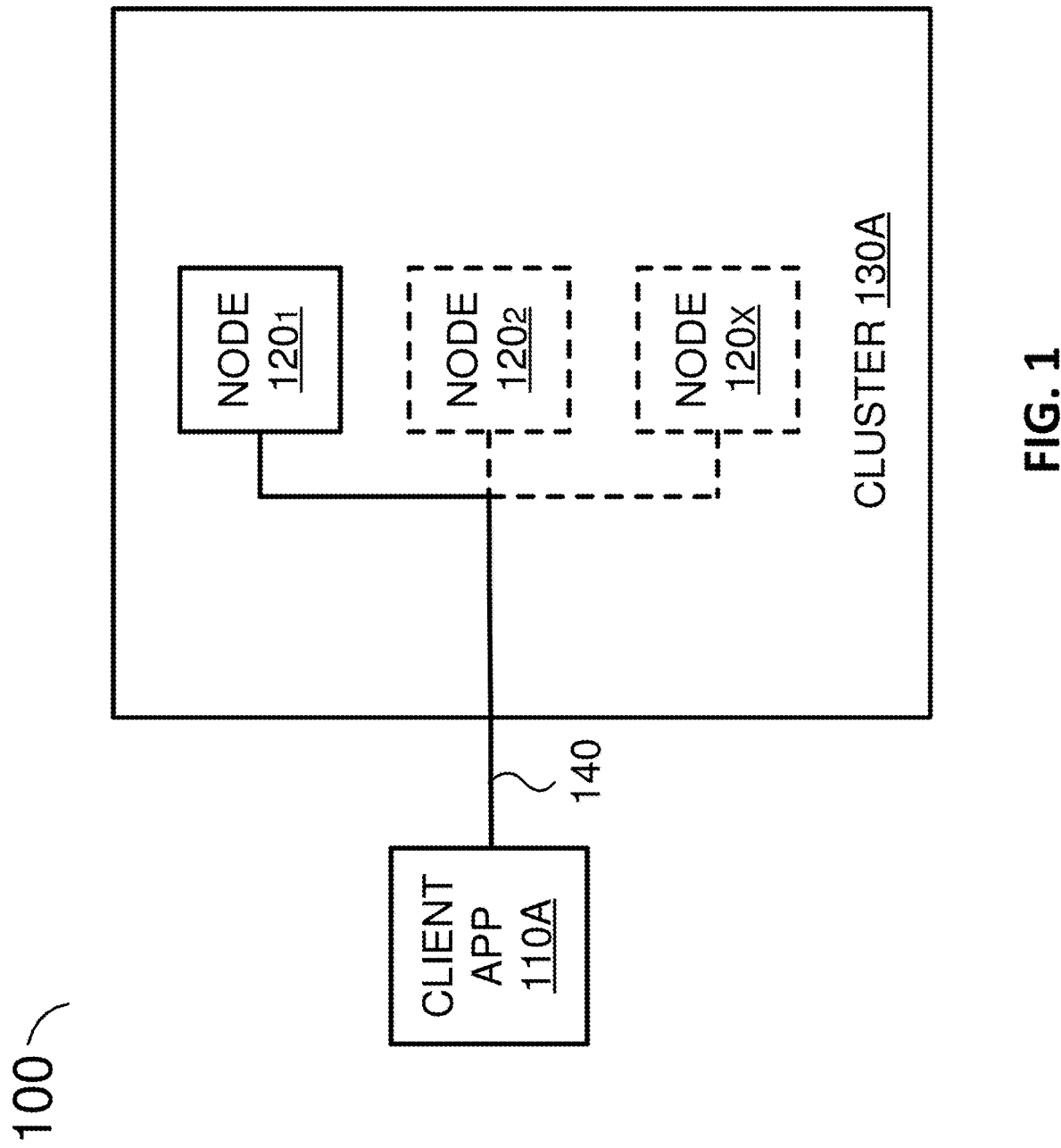
FIG. 1 is a simplified block diagram of a system having a distributed application structure, according to some embodiments.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

The present disclosure is related to various embodiments of systems and methods for autodiscovery monitoring with dynamic configuration launch. A user can utilize various embodiments to configure providers (e.g., container providers, etc.) that monitor for system changes and emit events to a common bus. Based on these events, the system in various embodiments detects situations when there is something new that can be monitored and instantiates new modules for it. The autodiscover aspects can enable other components to react and adapt to changes in dynamic infrastructures.

FIG. 1 is a simplified diagram illustrating a system 100 to illustrate certain concepts of the distributed nature and distributed application structure, according to some embodiments. System 100 includes client application 110A, one or more nodes 1201-120X, and connections 140. Collectively, one or more nodes 1201-120X form cluster 130A. When only one node (e.g., node 1201) is running, then cluster 130A is just one node. In various embodiments, a cluster (e.g., cluster 130A) is a collection of one or more nodes (servers) (e.g., one or more nodes 1201-120X) that together store data and provides federated indexing and search capabilities across all nodes. A cluster can be identified by a unique name, such that a node can be part of a cluster when the node is set up to join the cluster by its name. A cluster may have only one node in it. In some embodiments, a node (e.g., one or more nodes 1201-120X) is a single server that is part of a cluster (e.g., cluster 130A), stores data, and participates in the cluster's indexing and search capabilities. A node can be identified by a name which by default is a random Universally Unique IDentifier (UUID) that is assigned to the node at startup. Any number of nodes can be in a single cluster. In some embodiments, nodes (e.g., one or more nodes 1201-120X) can communicate using an application protocol (e.g., Hypertext Transfer Protocol (HTTP), transport layer protocol (e.g., Transmission Control Protocol (TCP)), and the like. Nodes can know about all the other nodes in the cluster (e.g., cluster 130A) and can forward client (e.g., client 11A) requests to the appropriate node. Each node can serve one or more purposes, master node and data node.

Each of client application 110A and one or more nodes 1201-120X can be a container, physical computing system, virtual machine, and the like. Generally, client application 110A can run on the same or different physical computing system, virtual machine, container, and the like as each of one or more nodes 1201-120X. Each of one or more nodes 1201-120X can run on the same or different physical computing system, virtual machine, container, and the like as the others of one or more nodes 1201-120X. A physical computing system is described further in relation to the exemplary computer system 1100 of FIG. 14. Virtual machines may provide a substitute for a physical computing system and the functionality needed to execute entire operating systems. Virtual machines can be created and run by a hypervisor which uses native execution to share and manage hardware, allowing for multiple environments which are isolated from one another, yet can exist on the same physical computing system.

Containers, in various embodiments, are an operating system-level virtualization method for deploying and running distributed applications without launching an entire virtual machine for each application. Containers can look like real computers from the point of view of programs running in them. Generally, a computer program running on an operating system can see all resources (e.g., connected devices, files and folders, network shares, CPU power, etc.) of that computer. However, programs running inside a container can only see the container's contents and devices assigned to the container. DOCKER is an open source collection of tools for creating and deploying software within containers. Containers can be arranged, coordinated, and managed by a container orchestration platform (e.g., KUBERNETES, DOCKER SWARM, AMAZON ELASTIC CONTAINER SERVICE, and the like). In contrast to hypervisor-based virtualization, containers may be an abstraction performed at the operating system (OS) level, whereas virtual machines are an abstraction of physical hardware.

When client application 110A runs on a different physical server from a node (e.g., of one or more nodes 1201-120X), connections 140 can be a data communications network (e.g., various combinations and permutations of wired and wireless networks such as the Internet, local area networks (LAN), metropolitan area networks (MAN), wide area networks (WAN), and the like using Ethernet, Wi-Fi, cellular networks, and the like). When a node (of one or more nodes 1201-120X) runs on a different physical computing system from another node (of one or more nodes 1201-120X), connections 140 can be a data communications network. Further details regarding the distributed application structure can be found in commonly assigned U.S. patent application Ser. No. 16/047,959, filed Jul. 27, 2018 and incorporated by reference herein.

Having provided the above details of certain concepts of the distributed application structure described above, the description now turns to further detailing aspects of the present technology for autodiscovery, etc. according to various embodiments.

The autodiscovery can be used with BEATS in some of the embodiments. BEATS are open source data shippers that can be installed as agent on a user's server to send operational data to ELASTICSEARCH (a distributed, multi-tenant-capable full-text search engine), for instance.

Figure 2:
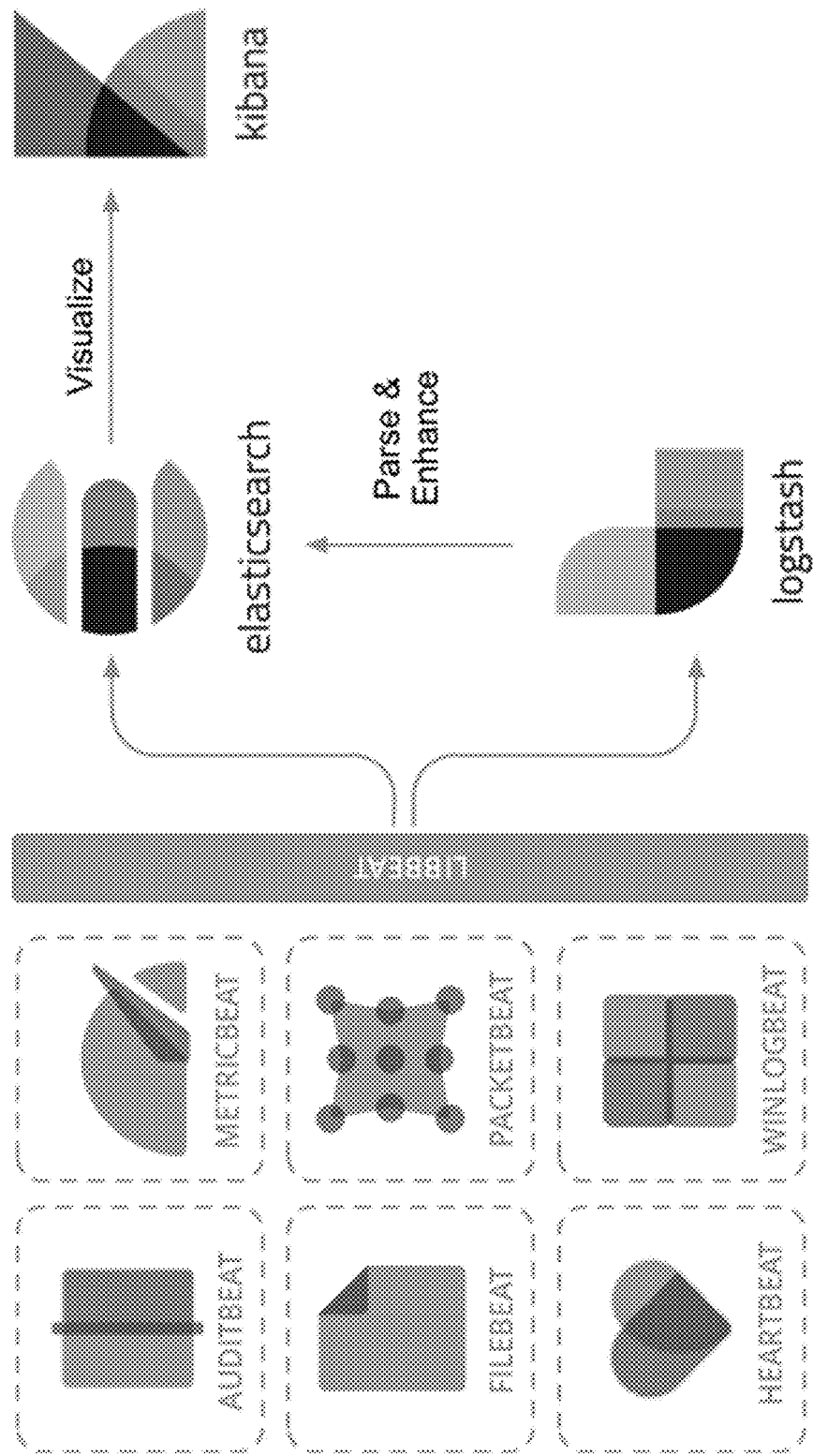
FIG. 2 is an example diagram illustrating various aspects and process flow, according to example embodiments.

FIG. 2 is an example diagram of a system 200 illustrating various BEATS and connections and flow with respect to other aspects of an integrated solution referred to as ELASTIC STACK. BEATS can capture various items including but not limited to audit data (AUDITBEAT), log files (FILEBEAT), availability (HEARTBEAT), metrics (METRICBEAT), network traffic (PACKETBEAT), and windows event logs (WINLOGBEAT). BEATS can send data directly into ELASTICSEARCH or via LOGSTASH (a data-collection and log-parsing engine) where it can be further processed and enhanced before visualizing it in KIBANA (an analytics and visualization platform). Although FIG. 2 includes BEATS and other particular aspects and components, the present technology is not limited to utilizing some or all of the components and aspects.

Autodiscovery can provide a way to automatically discover anything that the BEAT can monitor from the host. For example, if there is an APACHE service running in the system, autodiscovery can help FILEBEAT, METRICBEAT, PACKBEAT and others to detect the APACHE service and self configure themselves to get logs/metrics from the Apache service.

Figure 3:
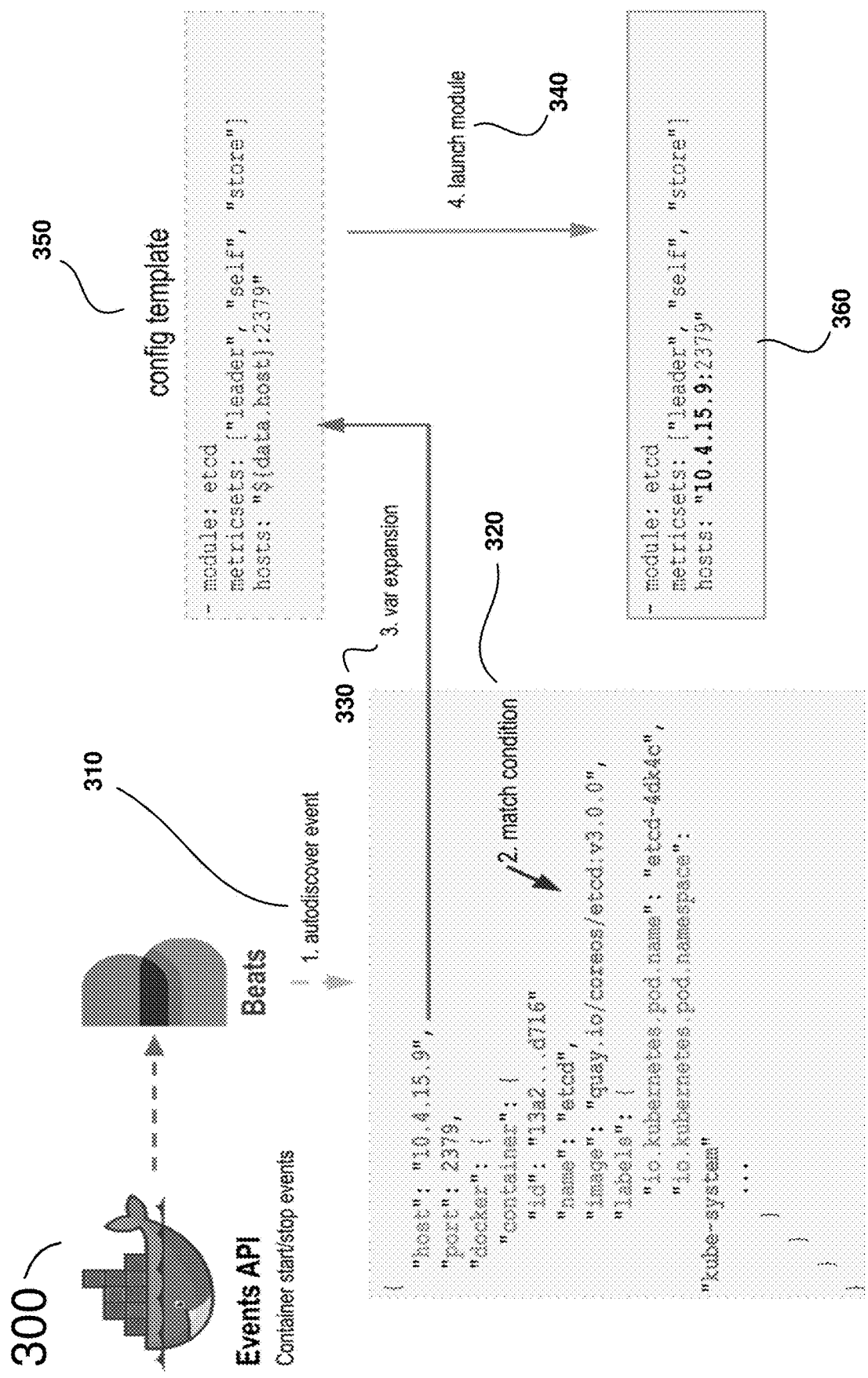
FIG. 3 is a diagram illustrating various aspects for an exemplary autodiscovery and module launching process for use with container-related providers, according to an example embodiment.

FIG. 3 is a diagram illustrating various aspects for an example 300 of an autodiscovery and module launching process for use with a container provider such as DOCKER and container orchestration platform such as KUBERNETES, according to an example embodiment.

Further regarding the autodiscover event 310 in the example in FIG. 3, BEATS Autodiscover may provide support for multiple providers, e.g., DOCKER, DOCKER SWARM, KUBERNETES, AMAZON ELASTIC CONTAINER SERVICE, port-based providers, process-based providers, file search providers, to name several. For example, such support can include but not be limited to, support DOCKER including monitoring DOCKER application program interface (API) and checking for every new container, support KUBERNETES including watching KUBERNETES API and matching labels/images, supporting Nmap and other port-based providers, supporting ps and other process-based providers, supporting file search providers, and other providers that are suitable to practice the present technology. The providers may implement a way to watch for events on a specific platform. Once an event happens, the provider can issue an autodiscover event, containing the information needed to react to it (e.g., check for a condition being satisfied, etc.). Autodiscovery providers can cooperate on the discovery process, signaling discovery events and listening for such events when, for example, host is discovered, a host:port is discovered, a file is discovered, to name a few. For example, a port-based scanner can nmap every time a DOCKER provider signals a new container In various embodiments, for the match condition 320 aspect in the example in FIG. 3, events are checked against a list of conditions that appear in a configuration (also referred to as "config") generated for this purpose. There may be one or more conditions. If one of the conditions matches the event, the process will spawn the specified set of configs for that event.

FIG. 4 illustrates an example configuration template identified as "config" 400 for configuring METRICBEAT to use the DOCKER autodiscover provider. For this "config" example, a user can define a list of templates having a condition that should trigger certain ones of the templates. In the example in FIG. 4, the condition is matching events that have the "container image" that contains "etcd" (the term "contains" is used here since the image field stores name:tag pairs).

Configuration templates may contain variables, these are substituted using variable expansion (see "var expansion" 330), by actual values from the event that triggered the condition. In the example in FIG. 4, the configuration template 400 includes a ${data.host} variable that is also shown in the "config template" 350 portion in FIG. 3. The use of a variable mechanism, in various embodiments, can enable a user to define dynamic configs that can depend on the status of a container, like the IP address. The use of variables in this way can also allow for more complex configurations, through the use of labels and annotations. Referring to the examples in FIG. 3 and FIG. 4, in response to the condition being satisfied (i.e., the "etcd" container (runtime instance of the image) being created), METRICBEAT will launch the "etcd" module to monitor the container, replacing the ${data.host} variable with the Internet Protocol (IP) address of the container. In some embodiments, the configuration template does not include a variable. In other embodiments, one or more variables are included.

A launch module step 340 is shown in the example in FIG. 3. For step 340 in various embodiments, the method will replace the ${data.host} variable with the container IP address to create the "final configuration" shown at 360. In various embodiments of the method, the final configuration is created and then launched. Valid configurations may include, for example, modules in METRICBEAT (to get metrics) and inputs in FILEBEAT (to get log files).

There may be both start and stop events, so a configuration launched by autodiscover will be automatically stopped once the container goes away, according to various embodiments. This automatically stopped feature does not require any special configuration by the user, in various embodiments.

Metadata can be very useful when navigating logs and metrics information, for instance, by allowing a user to filter the information and focus on just that filtered information that matters to the user. Typically, an add_kubernetes_metadata processor can be used to annotate each of the events with relevant metadata based on which KUBERNETES pod the event originated from. For this typical use, each event might be annotated with, for example, Pod Name, Namespace, and Labels. For use with DOCKER, an add_docker_metadata processor can typically be used to annotate each event with relevant metadata from DOCKER containers such as Container ID, Name, Image, and Labels. In some embodiments of the autodiscover method of the present technology, the events processed by the autodiscover will automatically get enriched with DOCKER and/or KUBERNETES metadata. Consequently, according to some embodiments, there is no need to use the add_docker_metadata or add_kubernetes_metadata processors to provide the enrichment.

In various embodiments, providers would implement the same interface, and receive a module factory from the BEAT, so they can instantiate new modules when a match happens. The providers may be fully automatic (no need for user input to do a match, and instantiate it) or in some embodiments, the providers may need some user definitions/mappings (guided discovery).

According to various embodiments, the user can configure several providers at the same time, the configured providers can cooperate on autodiscovery. For instance if KUBERNETES detects a new pod, KUBERNETES can signal its IP to the port-based provider such as Nmap, as will be described in further detail below. In various embodiments, the interface provided by the BEAT to the autodiscover service will provide the tools needed for this functionality including at least modules (e.g., a list of modules available to the BEAT that integrates the autodiscovery aspects; Start/Stop for Create/Start/Stop methods to instantiate modules when the modules are discovered, and to remove the modules in response to the condition is no longer met; module defaults can be provided since users may want to override default settings for some modules. In some embodiments, default settings mechanism are provided for some modules where autodiscover may just override specific parts of hit ('hosts' or file paths), for example using some formatted strings:hosts: ["(HOST):$(PORT)"].

Hints-based autodiscovery may be provided. In various embodiments, hints are information a module can provide to facilitate the autodiscovery process. A module may be a group of settings or code put together for various tasks, e.g., modules for metric collecting, for simplifying the collection, parsing, and visualization of common log formats for log files, etc. The BEAT may be asked for hints on a specific aspect, and gets the list of hints for each module.

In various embodiments, a user can utilize hints to define how to monitor the user's containers. Traditionally, a user would need to update their BEATS settings file to configure the monitoring of a newly deployed application. In various embodiments, hints-based autodiscover inverts the control of monitoring settings, by providing the ability for the user to store monitoring settings next to the application container instead of at a central place. The present technology can thus empower a team that is building and deploying an app to take responsibility on defining how to monitor it.

Hints can help speed up the autodiscovery process. For instance, a port-based scanner would ask for hints on port aspect, and then scan the given ports first, or perhaps only scan those. In some embodiments, a user may want to provide manual hints according to their infrastructure, e.g., to override apache ports.

Autodiscovery providers can cooperate on the discovery process, signaling discovery events and listening for such events when, for example, host is discovered, a host:port is discovered, a file is discovered, to name a few. For example, a port-based scanner can nmap every time a DOCKER provider signals a new container FIG. 5 illustrates an example 500 of hints for port-based, process-based and DOCKER providers. FIG. 6 illustrates an example config 600 for a localhost fully automatic discovery.

Referring to FIG. 5 and FIG. 6, a process in an example embodiments of the hints-based autodiscovery. This exemplary process includes getting hints on aspect port (see 500). The apache module returns [80, 443] as the hint for the port. An Ip provider may scan open ports (localhost case can be optimized to just get listening sockets). A new host:port event can be emitted for all open ports by the provider. A check may be run against all matching ports (scanned, hinted). Then, the process can instantiate modules for ports that pass the check.

FIG. 7 illustrates an example autodiscover config for DOCKER and ip (fully automatic, providers cooperation). In this example, the ports provider does nothing at the beginning (no hosts to scan); DOCKER watch container API for new containers; a new container is launched and DOCKER detects it and emits a new host event. The Ip provider listens to that event, in this example. In example embodiments, the provider gets hints from the BEAT and scans ports on the host starting with (port) hints; emits a new host:port event for all open ports; runs a check against all matching ports (scanned, hinted), and instantiate modules that pass the check.

FIG. 8 illustrates an example autodiscover config 800 for KUBERNETES guided discovery. For this example, a user defines a list of modules to match with labels, when a new KUBERNETES pod matching them starts the module gets a new instance. An example simplified process for this is as follows: watch KUBERNETES API for new pods; get a new pod, go over pods definitions and match them; emit a new host:port event for all pod ports; run a check against the host:port; and if the check passes, a module is instantiated.

FIG. 9 illustrates an example of an autodiscover config 900 for KUBERNETES. This config 900 enables hints-based autodiscover for KUBERNETES container logs. Various embodiments enable a user, for example, to utilize KUBERNETES Pod annotations or DOCKER labels to tell FILEBEAT and METRICBEAT how to treat the user's container logs. For instance, if the user is running a JAVA application in a pod, the user can add the annotations to it FIG. 10 illustrates example annotations 1000, according to an example embodiment. When a pod has multiple containers, the settings are shared, in various embodiments, unless the container name is put in the hint. In response the start of a KUBERNETES pod, FILEBEAT can process the annotations and start reading its logs with the multiline pattern given in the annotations, minded to put JAVA stack traces together.

According to various embodiments, a user can also use modules to process logs into structured data. For instance, if the user is running an NGINX server, the user may just add the annotations and all its logs will be processed into structured data to provide insights about activities logged.

Figure 11:
FIG. 11 illustrated further annotations, according to an example embodiment.

FIG. 11 illustrates additional example annotations 1100, according to an example embodiment. For this example, each stream of the log output is mapped to a different fileset. A user may also map all streams to a single fileset by defining just co.elastic.logs/fileset.

Figure 12:
FIG. 12 illustrated additional annotations, according to an example embodiment.

FIG. 12 illustrated further example annotations 1200, according to an example embodiment. A user may also benefit from hints when using METRICBEAT. This example in FIG. 12 shows how a user could configure the same NGINX instance to make METRICBEAT fetch metrics from it. The annotations 1200 can include variable expansion and in this example ${data.host} is a variable for the IP address of the container. The use of variables in this way can also allow for more complex configurations, through the use of labels and annotations.

In some embodiments, if the user is running both FILEBEAT and METRICBEAT, both sets of hits can be used together.

As can be seen from the above, in various embodiments, hints-based autodiscovery moves the configuration of a user's monitoring settings next to the applications the user wants to monitor, bringing the right tools to teams, especially in multi-tenant scenarios. Hints-based autodiscovery can also provide a simple set of instructions for a user to work with, making the experience simple and focused.

Figure 13:
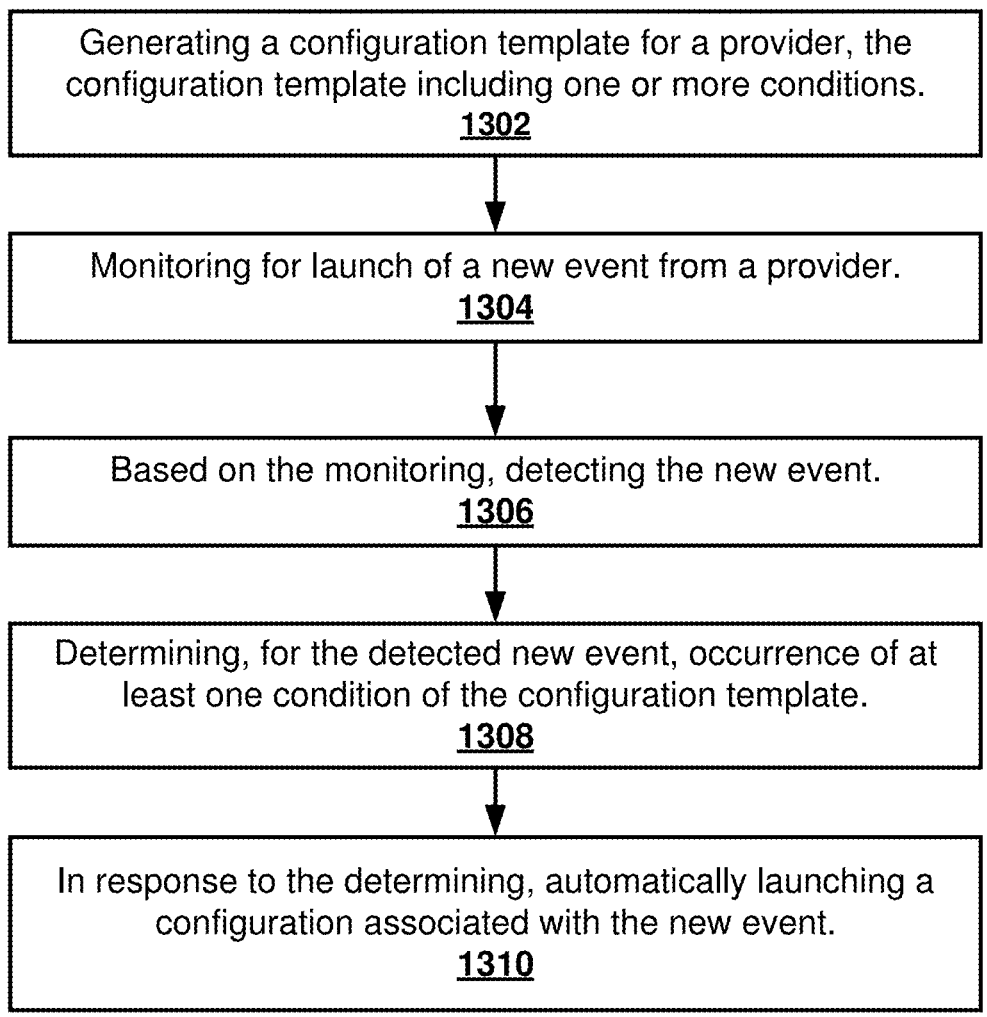
FIG. 13 is a simplified flow diagram of a method, according to an example embodiment.

FIG. 13 is a simplified flow diagram of a method 1300 for the autodiscover with dynamic launching according to an example embodiment, with further details described above and below.

Step 1302 includes generating a configuration template for a provider, the configuration template, as described further herein.

Step 1304 includes monitoring for launch of a new event from a provider, as described further herein Step 1306 includes, based on the monitoring, detecting the new event, as described further herein. This may be creation of the new event and may involve placing the new event on a common event bus as described further herein.

Step 1308 includes determining, for the detected new event, occurrence of at least one condition of the configuration template, as described further herein.

Step 1310 includes in response to the determining, automatically launching a configuration associated with the new event, as described further herein. The configuration may be a module comprising a group of settings for a particular task, e.g., getting metrics, getting logs, to name a few tasks.

As described further herein, new events may be emitted to a common bus by various providers. The provider may be a container-based provider, container orchestration platform, port-based provider, process-based provider, file search provider, or the like, as described further herein. For container providers, an automatically launched configuration can be automatically stopped once the container exits. The method may include determining that a detected new container includes one or more hints for determining a particular configuration to automatically launch, as described further herein.

Figure 14:
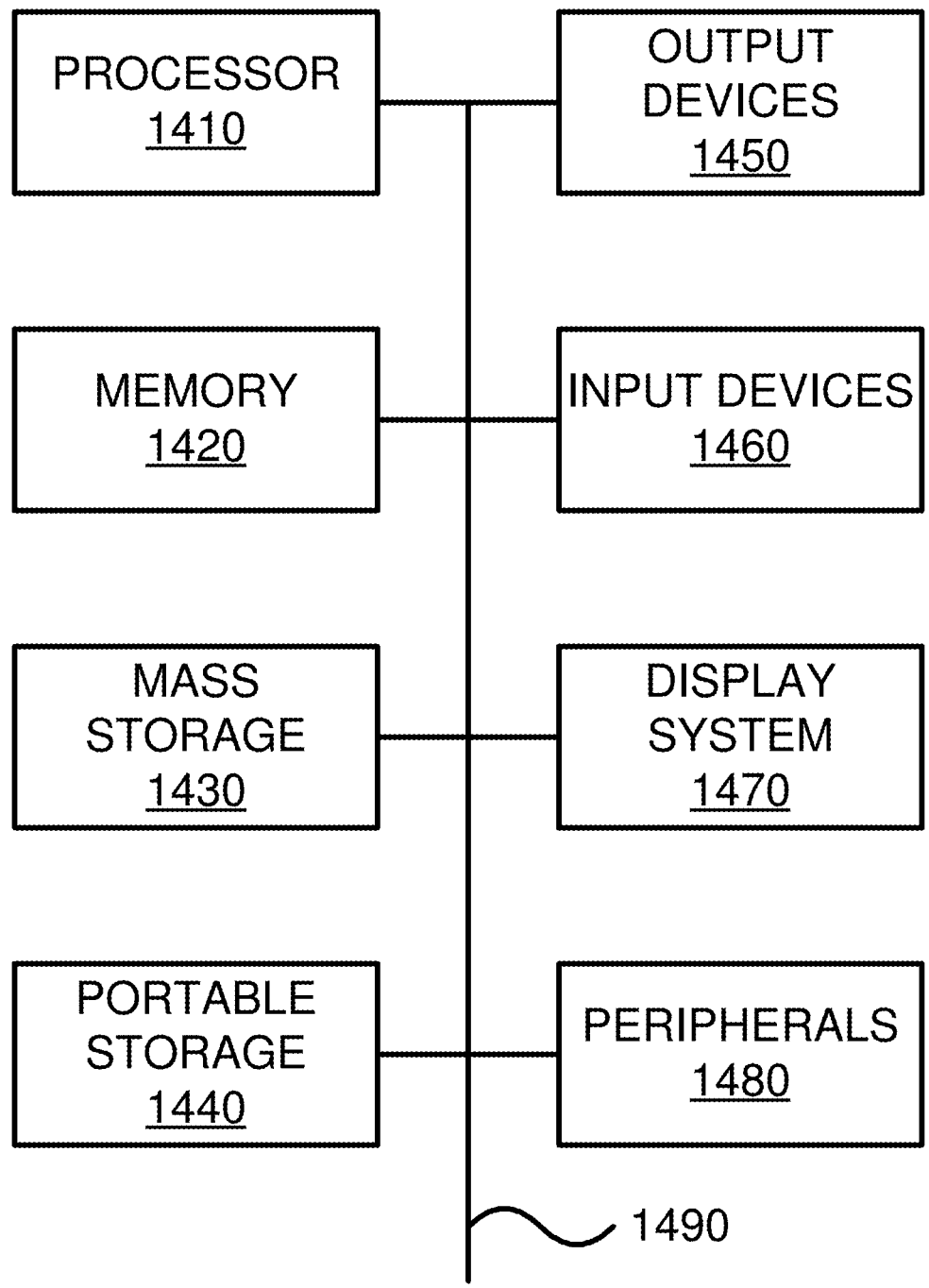
FIG. 14 is a simplified block diagram of a computing system, according to some embodiments.

FIG. 14 illustrates an exemplary computer system 1400 that may be used to implement some embodiments of the present invention. The computer system 1400 in FIG. 14 may be implemented in the contexts of the likes of computing systems, networks, servers, or combinations thereof. The computer system 1400 in FIG. 14 includes one or more processor unit(s) 1410 and main memory 1420. Main memory 1420 stores, in part, instructions and data for execution by processor unit(s) 1410. Main memory 1420 stores the executable code when in operation, in this example. The computer system 1400 in FIG. 14 further includes a mass data storage 1430, portable storage device 1440, output devices 1450, user input devices 1460, a graphics display system 1470, and peripheral device(s) 1480.

The components shown in FIG. 14 are depicted as being connected via a single bus 1490. The components may be connected through one or more data transport means. Processor unit(s) 1410 and main memory 1420 are connected via a local microprocessor bus, and the mass data storage 1430, peripheral device(s) 1480, portable storage device 1440, and graphics display system 1470 are connected via one or more input/output (I/O) buses.

Mass data storage 1430, which can be implemented with a magnetic disk drive, solid state drive, or an optical disk drive, is a non-volatile storage device for storing data and instructions for use by processor unit(s) 1410. Mass data storage 1430 stores the system software for implementing embodiments of the present disclosure for purposes of loading that software into main memory 1420.

Portable storage device 1440 operates in conjunction with a portable non-volatile storage medium, such as a flash drive, floppy disk, compact disk, digital video disc, or Universal Serial Bus (USB) storage device, to input and output data and code to and from the computer system 1400 in FIG. 14. The system software for implementing embodiments of the present disclosure is stored on such a portable medium and input to the computer system 1400 via the portable storage device 1440.

User input devices 1460 can provide a portion of a user interface. User input devices 14140 may include one or more microphones, an alphanumeric keypad, such as a keyboard, for inputting alphanumeric and other information, or a pointing device, such as a mouse, a trackball, stylus, or cursor direction keys. User input devices 1460 can also include a touchscreen. Additionally, the computer system 1400 as shown in FIG. 14 includes output devices 1450. Suitable output devices 1450 include speakers, printers, network interfaces, and monitors.

Graphics display system 1470 include a liquid crystal display (LCD) or other suitable display device. Graphics display system 1470 is configurable to receive textual and graphical information and processes the information for output to the display device.

Peripheral device(s) 1480 may include any type of computer support device to add additional functionality to the computer system.

Some of the components provided in the computer system 1400 in FIG. 14 can be those typically found in computer systems that may be suitable for use with embodiments of the present disclosure and are intended to represent a broad category of such computer components. Thus, the computer system 1400 in FIG. 14 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 1400 may be implemented as a cloud-based computing environment, such as a virtual machine operating within a computing cloud. In other embodiments, the computing system 1400 may itself include a cloud-based computing environment, where the functionalities of the computing system 1400 are executed in a distributed fashion. Thus, the computing system 1400, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computing system 1400, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, e.g., optical, magnetic, and solid-state disks, such as a fixed disk. Volatile media include dynamic memory, such as system random-access memory (RAM). Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, e.g., a floppy disk, a flexible disk, a hard disk, magnetic tape, any other magnetic medium, a CD-ROM disk, digital video disk (DVD), any other optical medium, any other physical medium with patterns of marks or holes, a RAM, a programmable read-only memory (PROM), an erasable programmable read-only memory (EPROM), an electrically erasable programmable read-only memory (EEPROM), a Flash memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (e.g., through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

What is claimed is:

1. A computer-implemented method for autodiscovery with dynamic configuration, the computer-implemented method comprising:
    generating a configuration template for a provider, the configuration template including one or more conditions;
    receiving one or more hints, the one or more hints providing information for the configuration template for monitoring a new event from the provider, the configuration template being stored next to an application container;
    automatic monitoring by a plurality of cooperating providers for launch of the new event from the provider;
    based on the monitoring, detecting the new event;
    determining from a list of conditions, for the detected new event, occurrence of at least one condition of the configuration template; and
    in response to the determining of the occurrence of the at least one condition of the configuration template for the detected new event, automatically launching a configuration associated with the new event, the configuration template including a variable, the variable being substituted, using variable expansion, by one or more actual values from the new event that triggered at least one of the one or more conditions, the one or more actual values being supplied by cooperation of the plurality of providers.

2. The method of claim 1, wherein the configuration is a module and the launching is an instantiation of the module.

3. The method of claim 2, wherein the module comprises a group of settings for particular tasks.

4. The method of claim 1, wherein the new event is emitted to a common bus by the provider.

5. The method of claim 4, wherein the new event is one of a plurality of events emitted to the common bus by the provider and other providers.

6. The method of claim 1, wherein the provider is a container provider or a container orchestration platform and the new event is a new container.

7. The method of claim 6, wherein the provider is DOCKER or KUBERNETES.

8. The method of claim 1, wherein the provider is a port-based provider, process-based provider, or file search provider.

9. The method of claim 6, further comprising determining that the detected new container included the one or more hints.

10. The method of claim 9, wherein the configuration includes container labels or container annotations, wherein the one or more hints are located in the container labels or container annotations.

11. The method of claim 9, wherein, based on the one or more hints, determining a configuration of a module.

12. The method of claim 9, wherein the one or more hints include a hint on which specific port aspect to use, so as to enable a port scanner, based on the hint, to scan only the specific ports.

13. The method of claim 1, wherein the monitoring includes monitoring container API for signals indicative of a new container.

14. The method of claim 13, further comprising retrieving logs from the new container based on the one or more hints instead of being based on a default retrieval process.

15. The method of claim 1, wherein the configuration automatically launched is automatically stopped once a container exits.

16. The method of claim 1, wherein the one or more hints include a hint associated with container logs.

17. The method of claim 16, further comprising, creating a new configuration by replacing a variable in the configuration template with a container IP address for the new event which triggered the at least one condition.

18. The method of claim 1, further comprising automatically enriching the new event with DOCKER or KUBERNETES metadata.

19. The method of claim 1, wherein the variable is substituted, using variable expansion, with an Internet Protocol (IP) address of the application container, for the new event which triggered the at least one condition.

20. The method of claim 19, wherein ${data.host} is the variable that is substituted with the IP address of the application container.

21. A system comprising:
a processor; and
a memory communicatively coupled to the processor, the memory storing instructions executable by the processor to perform a method, the method comprising:
generating a configuration template for a provider, the configuration template including one or more conditions;
receiving one or more hints, the one or more hints providing information for the configuration template for monitoring a new event from the provider, the configuration template being stored next to an application container;
automatic monitoring by a plurality of cooperating providers for launch of the new event from the provider;
based on the monitoring, detecting the new event;
determining from a list of conditions, for the detected new event, occurrence of at least one condition of the configuration template; and
in response to the determining of the occurrence of the at least one condition of the configuration template for the detected new event, automatically launching a configuration associated with the new event, the configuration template including a variable, the variable being substituted, using variable expansion, by one or more actual values from the new event that triggered at least one of the one or more conditions, the one or more actual values being supplied by cooperation of the plurality of providers.

22. A system comprising:
means for generating a configuration template for a provider, the configuration template including one or more conditions;
means for receiving one or more hints, the one or more hints providing information for the configuration template for monitoring a new event from the provider, the configuration template being stored next to an application container;
means for automatic monitoring by a plurality of cooperating providers for launch of the new event from the provider;
means for, based on the monitoring, detecting the new event;
means for, determining from a list of conditions, for the detected new event, occurrence of at least one condition of the configuration template; and
means for, in response to the determining of the occurrence of the at least one condition of the configuration template for the detected new event, automatically launching a configuration associated with the new event, the configuration template including a variable, the variable being substituted, using variable expansion, by one or more actual values from the new event that triggered at least one of the one or more conditions, the one or more actual values being supplied by cooperation of the plurality of providers.

* * * * *